March 10, 1936.    W. PEASLEE    2,033,395

MACHINE TOOL

Filed May 31, 1934    5 Sheets-Sheet 1

Inventor
WILLETTS PEASLEE
By AHK Parsons
Attorney

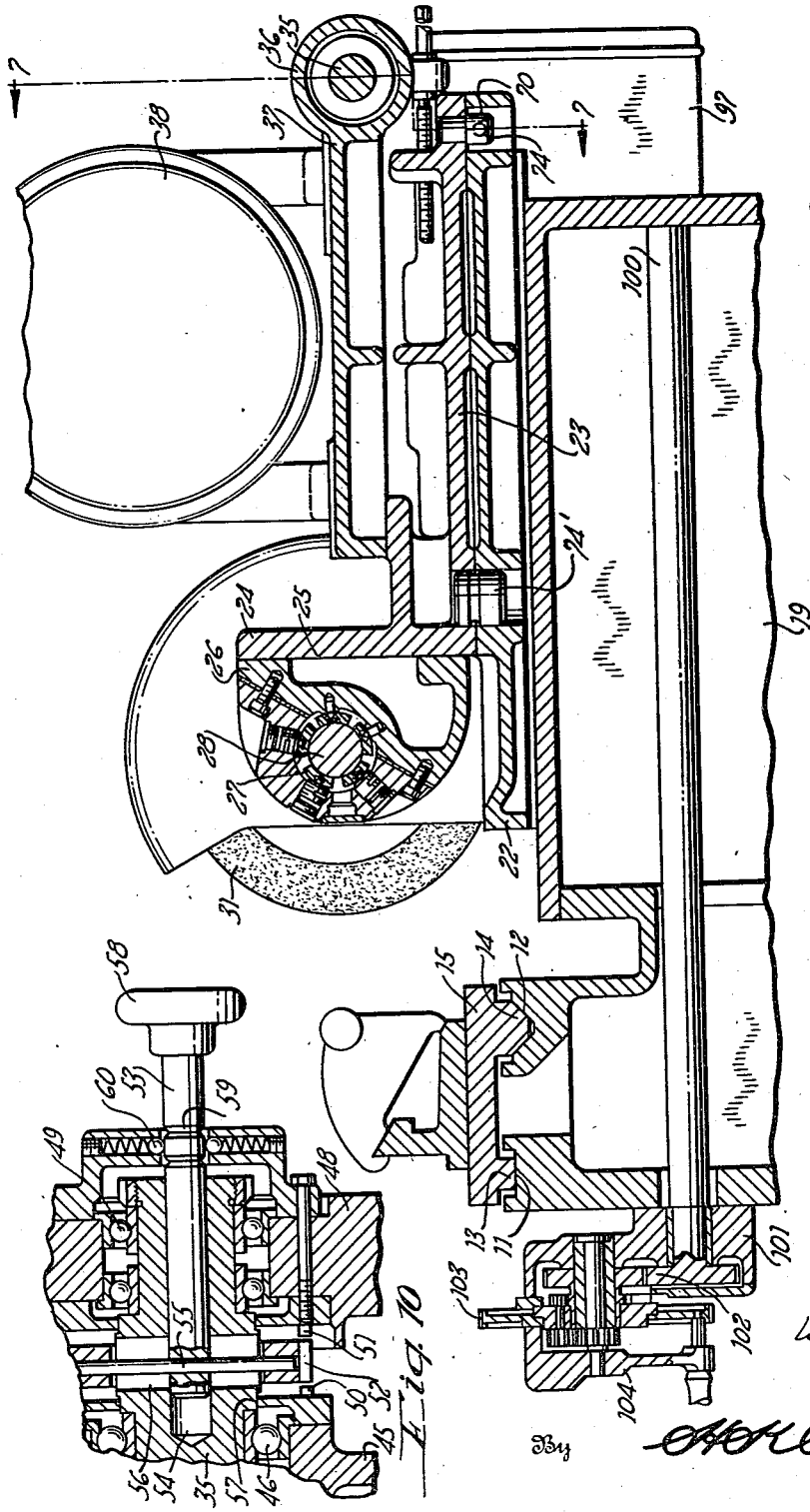

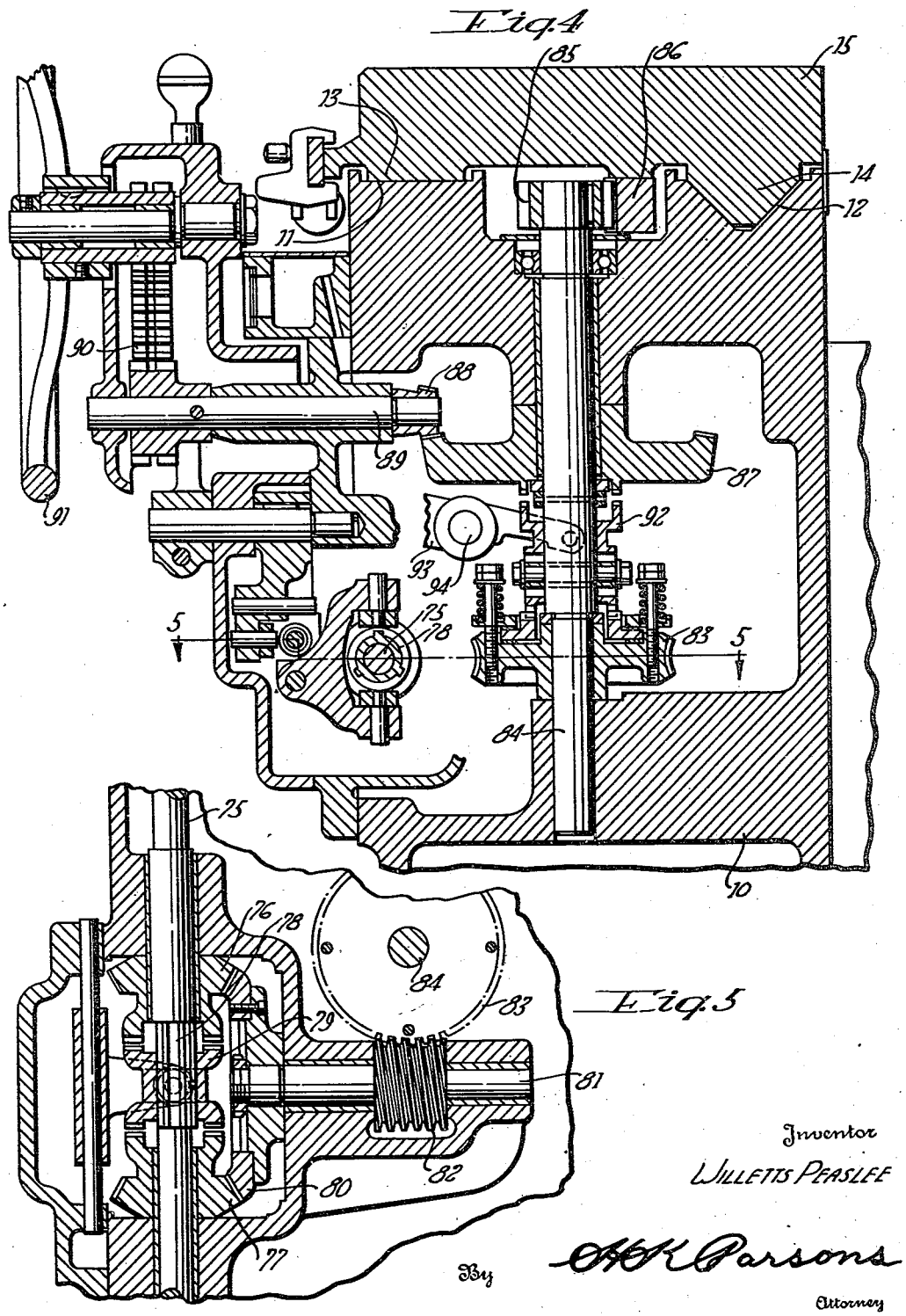

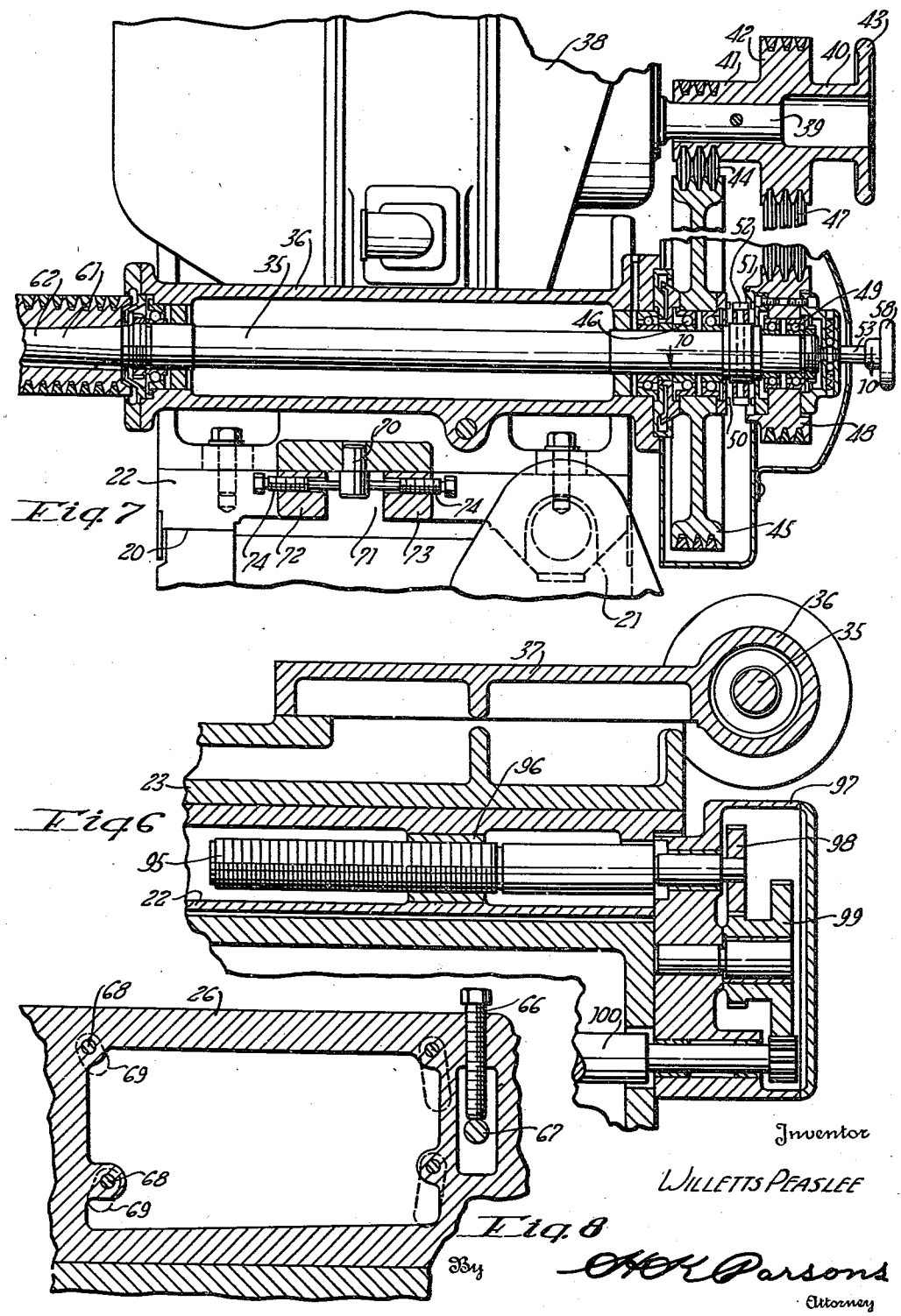

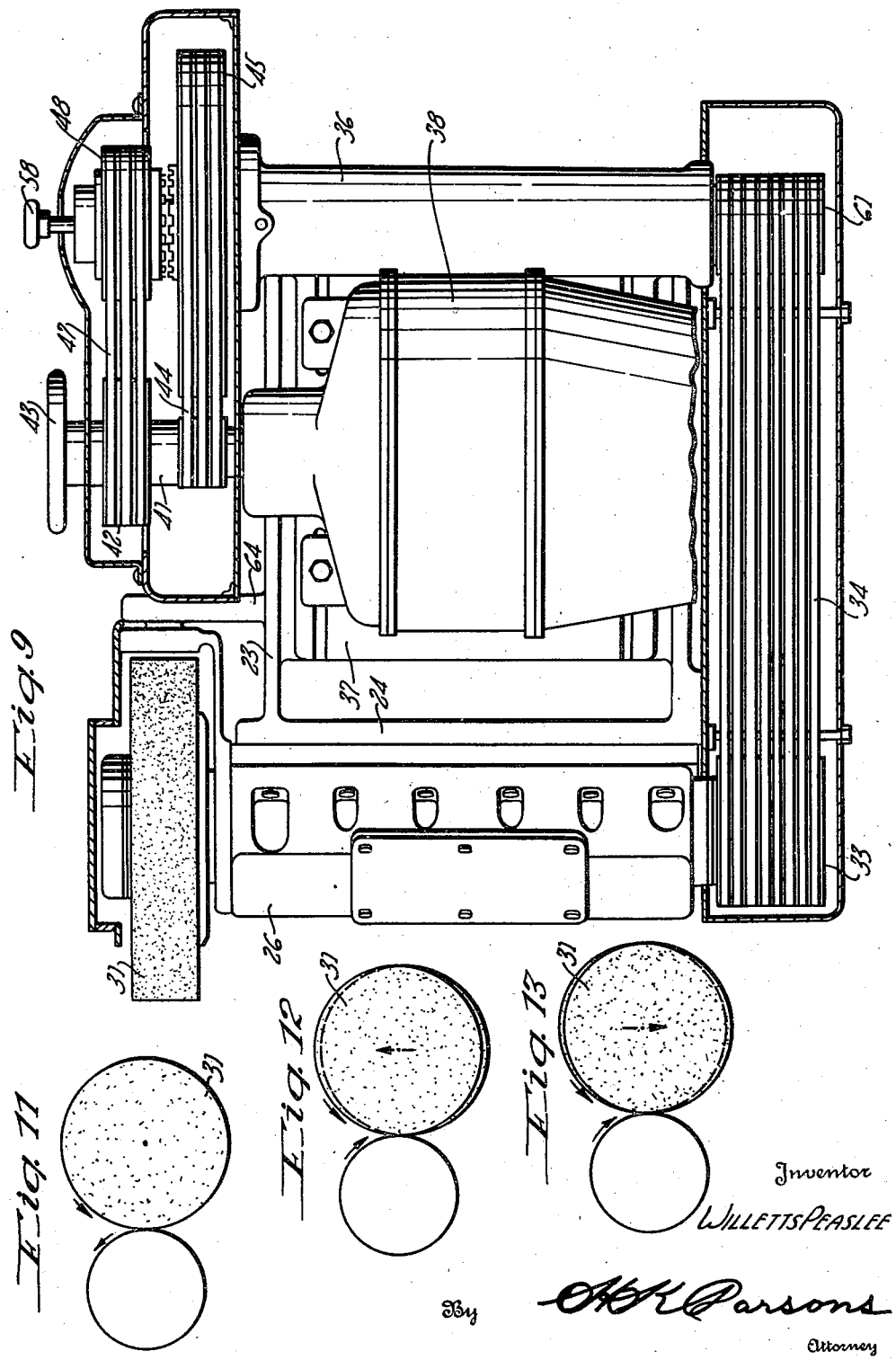

Patented Mar. 10, 1936

2,033,395

UNITED STATES PATENT OFFICE 2,033,395

MACHINE TOOL

Willetts Peaslee, Cincinnati, Ohio, assignor to Cincinnati Grinders Incorporated, Cincinnati, Ohio, a corporation of Ohio Application May 31, 1934, Serial No. 728,317

8 Claims. (Cl. 51—95)

This invention relates to improvements in machine tools and particularly to machines for providing a fine finish on surfaces of cylindrical work pieces.

An object of the invention is the provision of an improved combined grinding and lapping machine in which cylindrical work pieces may be ground to final form and size and then lapped or further finished to provide the desired surface on the work.

Another object of the invention is the provision of an improved machine for performing successive grinding and lapping operations on cylindrical work pieces.

A still further object of the invention is the provision of a machine in which chatter and other minute irregularities are removed from work pieces whereby the resultant work piece has a very smooth, fine surface and is substantially devoid of any blemishes.

It is also an object of the present invention to provide an improved combined grinding and lapping machine adapted to be readily operable as either of these machines and in which all of the parts are subject to minute adjustment for accurately positioning the same with respect to one another and with the work and whereby work pieces such as rolls and the like employed in paper and steel mills are produced with any desired surface and within extremely minute limits of tolerance so far as parallelism and concentricity of the surface is concerned with respect to the axis.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 3 is a transverse sectional view taken substantially on line 3—3 of Figure 1.

Figure 4 is a fragmentary sectional view taken on line 4—4 of Figure 1.

Figure 5 is a fragmentary sectional view taken on line 5—5 of Figure 4.

Figure 6 is a sectional view taken in the same plane as Figure 3 slightly displaced with respect thereto and illustrating the adjusting screw actuating mechanism.

Figure 7 is a fragmentary sectional view illustrating the drive to the countershaft behind the wheel spindle as seen for example from line 7—7 on Figure 3.

Figure 8 is a fragmentary sectional view taken on line 8—8 of Figure 2.

Figure 9 is a top plan view of a portion of the machine such as the wheel head and showing the drive to the wheel spindle.

Figure 10 is a sectional view through the clutch shifting mechanism as seen for example from line 10—10 on Figure 7.

Figure 11 is a diagrammatic view illustrating the relationship of the parts during a grinding operation.

Figures 12 and 13 are diagrammatic views illustrating the relationship of the parts during lapping operations.

Throughout the several views of the drawings similar reference characters are employed to denote the same or similar parts.

Figure 1:
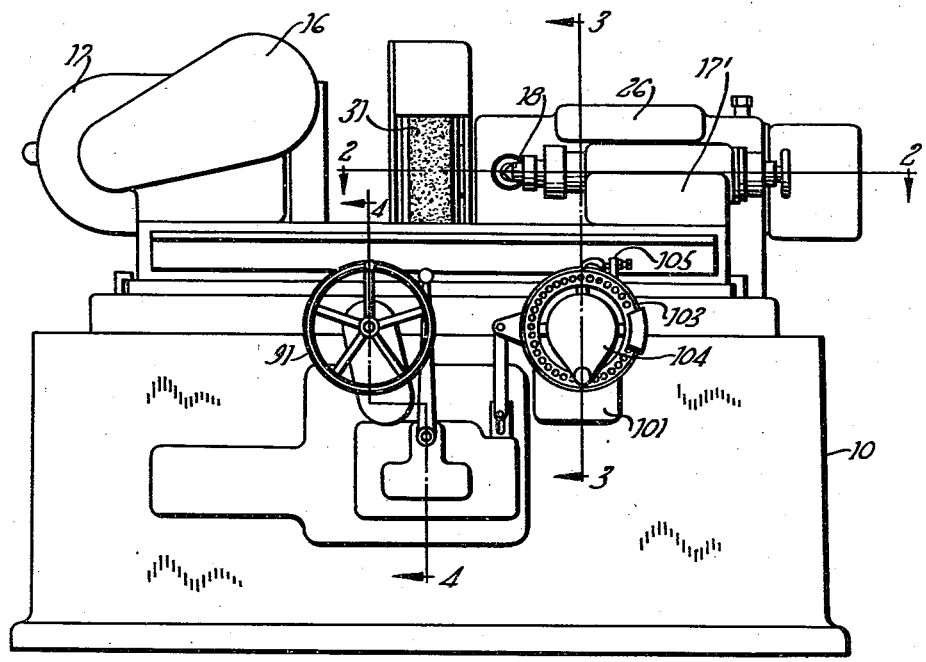
Figure 1 is a front elevation of a machine tool embodying the improvements of the present invention.

As was noted above, the machine of this invention may be alternately utilized for grinding cylindrical work pieces or lapping the surface of the pieces. The machine will probably find its greatest utility for finishing rolls as used in paper and steel rolling mills since these rolls must be finished to certain definite dimensions within very close tolerances and the rolls must have a smooth fine surface thereon in order to produce smooth finished steel and paper products. It is to be understood, however, that the machine is not limited to this use. In the past, the rolls were merely finished in a grinding machine and then utilized without being lapped or else the surfaces of the rolls were hand lapped or placed in a machine for the final operation which could be employed only for that purpose.

In grinding machines as heretofore employed the work and wheel had their axes disposed parallel to one another and due to vibrations in certain of the parts flats were formed on the work frequently throughout the length thereof. Furthermore, with the roll and grinding wheel rotating in the same plane in tandem relation to one another the grinding wheel grains left circular alternate grooves and ridges in the work, heretofore called grain lines. It is true that the flats or chatters and the grooves or grain marks which encircled the work were relatively minute but they still interfered with the use of the work piece or roll for producing fine work pieces.

By the present invention the axes of the work and wheel are disposed in angular relation to one another, particularly when producing the final finish, thereby breaking up the grinding or grain lines which encircled the work and at the same time effectively eliminating the previously formed chatters in the work. The elimination of the chatters in the work is effected by causing the grinding wheel, in effect, to wrap itself around the work, thereby simultaneously contacting the high parts or ridges which flank the flats of several adjacent chatters on the work.

It is additionally proposed by the present invention to change the ratio of rates of rotation between the wheel and the work thereby breaking up the periods of vibration of the parts which in the ordinary grinder is partly responsible for the formation of chatter. It has been found that by changing this period of vibration, such as by either increasing the speed of the work or decreasing the speed of the wheel the resultant work is remarkably free of chatter marks, and in view of the wrapping of the wheel around the work, thereby eliminating previously formed chatter, the work has a resultant high regular finish thereon.

Specifically, the machine of the present invention comprises a bed 10 having formed longitudinally of its forward portion a pair of guide ways 11 and 12. Disposed on the guide ways are the guides 13 and 14 depending from a work supporting table 15. The table 15 has secured to one end thereof a headstock 16 adapted to be connected with a work piece supported thereby as is usual practice for rotation by a prime mover or motor 17 associated with the said headstock 16. Opposed to the headstock 16 and adjustably carried by the table 15 for adjustment toward and from the headstock 16 is a tailstock 17' having projecting from its spindle a center 18 cooperating with a similar center associated with the headstock 16 for determining the axis of rotation of the work. The headstock motor 17 is of the variable speed reversible type whereby the direction and speed of rotation of the work may be considerably varied.

The bed 10 has projecting rearwardly therefrom a bed extension 19 on which is formed, see Figure 7, guide ways 20 and 21 receiving similar shaped guide portions of a slide member 22. The slide member 22 supports a wheel head and components parts thereon. The slide 22 has mounted thereon a bracket or carriage 23, in turn having upstanding therefrom at its forward end a face plate or flange 24. The forward face 25 of the plate 24 is planed smooth and forms a flat bearing for a wheel head 26. The wheel head 26 carries bearings 27 for a spindle 28; and the spindle 28 is provided at one end with a tapered nose 29 to which is secured a collet 30 for a wheel 31. The other end of the spindle 28 is likewise provided with a tapered nose 32 to which is secured a sheave 33 of the multiple groove type. Trained about the sheave 33 is a plurality of flexible transmission members such as V belts 34 deriving motion from a counter or jackshaft 35.

The counter or jackshaft 35 is rotatably journaled in anti-friction bearings supported by a housing 36 secured to or integral with a motor supporting bracket or slide 37. As seen in Figure 3 the motor supporting bracket 37 is disposed on the carriage 23 behind the plate 25 and in turn supports a prime mover or motor 38. As seen in Figure 7 the motor 38 has projecting therefrom the usual motor shaft 39 to which is pinned or otherwise secured a compound sheave or pulley 40. The compound sheave 40 in effect comprises a small diameter sheave 41 and a large diameter sheave 42, as well as a hand wheel 43 whereby the parts may be manually rotated for a purpose which will later be made clear. The small diameter sheave 41 has trained thereabout a plurality of flexible motion transmitting members such as V belts 44 which are in turn trained about a relatively large sheave 45 loosely journaled on anti-friction bearings 46 carried by the counter or jackshaft 35. The large diameter pulley 42 has likewise trained thereabout a plurality of flexible transmission members such as V belts 47, in turn trained about a sheave 48, also journaled on anti-friction bearings 49 carried by the counter or jackshaft 35. The pulley or sheave 45 has projecting from its inner face clutch teeth 50, while the pulley or sheave 48 has projecting from its adjacent face similar clutch teeth 51. Disposed on the counter or jackshaft 35 between the said pulleys is a clutch member 52 adapted to selectively connect with either the clutch teeth 50 or 51 for thereby securing either the pulley 45 or pulley 48 to the shaft 35. Since the ratios between the pulleys 45 and 41 and 48 and 42 vary greatly the shaft 35 will be rotated at two different speeds, depending upon which of the driven pulleys 45 or 48 is connected through the clutch 52 with the shaft 35.

The means for shifting the clutch 52 is shown in Figure 10 and comprises a shifter rod 53 disposed for sliding movement in a bore 54 in one end of the counter or contact shaft 35. The rod 53 has secured thereto near its inner end a pin 55 which extends through diametrically disposed elongated apertures 56 formed in the enlarged portion 57 of the shaft 35. The enlarged portion 57 constitutes a splined bearing portion for the clutch member 52 whereby the said clutch member is rotated by the shaft 35 but may be axially shifted relative thereto. The rod 53 is provided on its outer end with a knob 58 whereby the said rod is axially shifted, together with the clutch member 52. In order to determine the operative positions of the rod and therefore the clutch 52 the said rod is provided with a pair of V shaped notches 59 cooperating with a spring pressed detent 60.

From the foregoing it is believed now evident how the shaft 35 may be rotated at a high or low rate of speed. The opposite end of the shaft 35 is reduced to form a tapered nose 61 on which is secured a pulley or sheave 62 shown in the drawings as of the multiple V groove type, about which is trained the flexible transmission members or V belts 34. From this it is now evident that the grinding wheel spindle 28 may be driven at a high or a low speed depending upon which of the sheaves on the motor shaft is doing the driving.

It should be noted at this time that the grinding wheel 31 is rotated at its usual high grinding rate of speed, while effecting normal grinding operations on work pieces between the head and tailstocks 16 and 17. Also, as is usual practice, while effecting this grinding operation the axes of the spindle and the work are disposed in parallelism. The grinding wheel 31 is rotated at the much slower rate of speed when effecting a fine or lapped finish on the work, and at this time the axes of the work and wheel are angularly disposed with respect to one another. With the axis of the grinding wheel disposed at an angle to the axis of the work and in order to contact the work substantially along a line the surface of the grinding wheel is slightly concaved. Due to this particular relationship of the work and wheel the wheel in effect wraps itself around the work in substantially a spiral line for a purpose that will later be explained in detail.

The means for supporting the wheel for angular adjustment comprises a pivot or trunnion member 63 disposed partly in a bracket 64 secured to the slide 23 and partly in a bracket 65 secured to the wheel head 26. It will be noted that the axis of the trunnion 63, and therefore the axis about which the wheel 26 is oscillated for angularly disposing the wheel 31, is in the same plane as the point where the horizontal and vertical axes of the wheel cross one another, which is also the plane in which the axis of the work lies. From this it will be seen that the center of the path of contact of the wheel when angularly disposed relative to the work contacts with the work at a point in the plane of horizontal extent of the work axis while the portion of this line of contact of the wheel and the work on either side of the center is above and below the said plane of the work axis.

In order to effect the adjustment of the wheel head 26 about the trunnion 63, it carries, as seen in Figure 8, an adjusting screw 66 abutting on its lower end with a stud 67 projecting from the flange or face plate 25 of the slide 23. A plurality of clamping screws 68 are provided, being threaded into the wheel head 26 and passing through elongated apertures 69 in the face plate or flange 25 for clamping the said head in adjusted positions.

Figure 2:
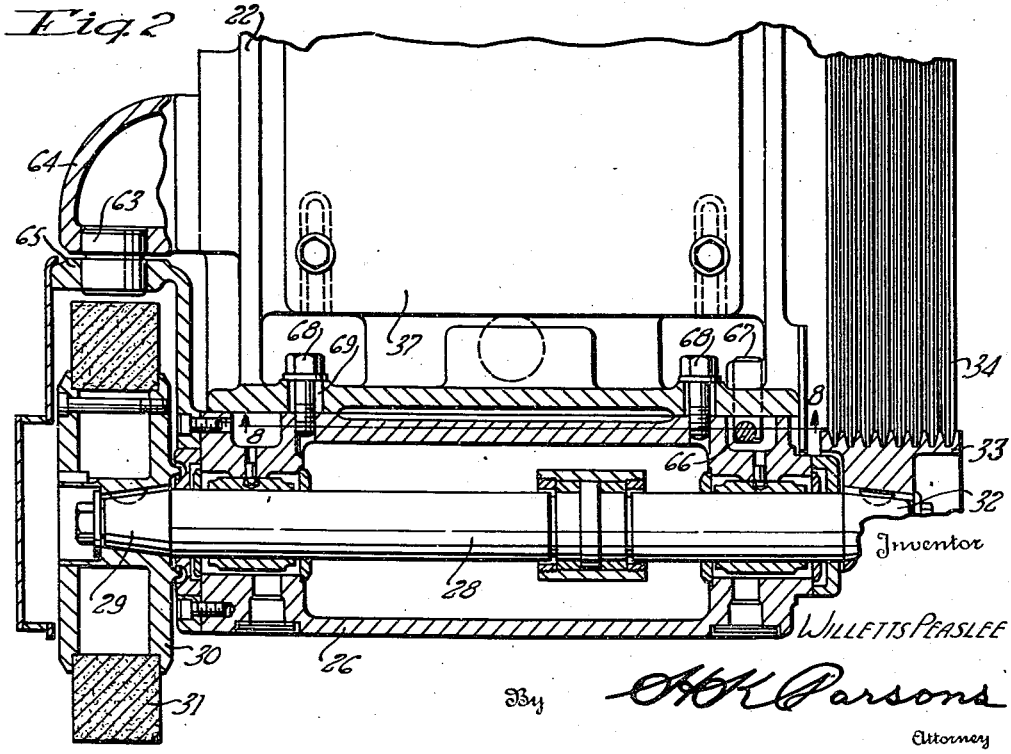
Figure 2 is a view partly in section and partly in elevation as seen substantially from line 2—2 of Figure 1.

In order to dispose the vertical planes of the axes of the work and grinding wheel spindle 28 in parallelism, the upper slide 23 is adapted to be adjusted in a horizontal plane relative to the lower slide 22. The means for accomplishing this comprises, as seen in Figures 3 and 7, a stud 70 carried by the upper slide 23 and depending downwardly therefrom into a socket or passageway 71 formed in the lower slide 22. The said lower slide 22 is provided with arms 72 and 73 which flank the way or socket 71 and into each of these arms is threaded an adjusting screw 74 which abut on their inner ends with opposite sides of the stud 70. Just behind the face plate or flange 25 the upper and lower slides 22 and 23 are provided with bores in axial alignment, each receiving a portion of a pivot stud or trunnion member 74' which, as seen in Figure 2, is located substantially midway of the length of the spindle 28 and about the axis of which the upper slide is adjusted. From the foregoing it is believed now evident that by backing away either one of the adjusting screws 74 and tightening the other of said screws the slide may be oscillated about the axis of the trunnion 74' and thereby dispose the axes of the work and grinding wheel spindle in parallelism. As is usual in machine tools of the type disclosed in the drawings, the work table 15 is adapted to be translated in reverse directions carrying with it the work relative to the grinding wheel. Any suitable means may be employed for this purpose, that shown in the drawings being of a usual and well-known construction and comprising a constantly rotating power shaft 75 on which is loosely mounted bevel gears 76 and 77. The said gears are spaced from one another and the shaft 75 therebetween is provided with a splined portion 78 on which is slidably mounted a reversing clutch 79 adapted to alternately connect one of the gears 76 and 77 to the shaft. The gears 76 and 77 are in constant mesh with a complementary bevel gear 80 on one end of a worm shaft 81. The said shaft 81 has keyed or otherwise secured to it worm 82 meshing with a worm wheel 83 loosely mounted on a vertical shaft 84, see Figure 4. The upper end of the shaft 84 carries a rack pinion 85 meshing with the teeth of a rack bar 86 secured to the under surface of the work supporting table 15.

Additionally, the vertical shaft 84 has loosely mounted thereon a bevel gear 87 in mesh with a bevel pinion 88 on a short shaft 89. The shaft 89 is connected by a chain and sprocket mechanism 90 with a hand wheel 91 and whereby the said shaft 89 and therefore the bevel gear 87 are manually actuated. In order to connect either the bevel gear 87 and therefore the hand wheel 91 with the vertical shaft 84 or the worm wheel 83 and therefore the power shaft 75 with said shaft 84, the said bevel gear 87 and worm wheel 83 are provided with opposed clutch teeth adapted to be engaged by clutch member 92 keyed to the shaft 84 for rotation therewith but slideable relative thereto. The clutch 92 is shifted to its operative positions by means of a lever 93 which has its one end connected therewith and which is operable about a pivot 94 disposed intermediate its ends. The lever 93 projects outwardly beyond the bed to receive a handle or the like whereby it is operated.

The lower slide 22, together with the parts carried thereby, is adapted to be fed at incremental rates toward the work table 15. Any suitable or desirable means may be utilized for this purpose, that shown in the drawings being of a conventional construction and comprising, as seen in Figure 6, an adjusting screw 95 having its threaded end received in a nut 96 carried by the said slide and conveniently disposed in the V guide associated with the bed guideway 21. The rear end of the screw 95 projects into a housing 97 which is secured to the rear of the bed extension 19. Keyed or otherwise secured to said rear end of the screw 95 is a gear 98 connected through the gear transmission 99 with one end of a transverse shaft 100. The shaft 100 extends transversely of the bed, projecting beyond the front thereof into a bracket or housing 101. Within the housing 101 is the usual feeding mechanism 102 which terminates in a ratchet wheel 103 and a hand wheel 104. The ratchet wheel 104 is operable by the usual picker dog mechanism 105. From the foregoing it should now be evident that the slide and parts carried thereby may be power or manually fed toward the work table.

The operation of the machine is as follows:

While effecting grinding operations the axes of the grinding wheel and work are disposed in parallelism, at which time the wheel and work are related to one another as shown diagrammatically in Figure 11. At this time the work headstock motor 17 is rotated at a speed determined largely by the diameter of the work and in a clockwise direction while the grinding wheel is rotated at a high speed through the sheaves 42 and 46 in a clockwise direction. With the work and wheel so rotated the proximate or engaging portions thereof are traveling in opposite directions and the ratio difference between their speeds of rotation and therefore the peripheral travel is substantially the sum thereof, which effects a relatively rapid or heavy stock removal per axial pass of the work and wheels. The peripheral face of the wheel at this time may be either plane or convex, depending upon whether or not a straight cylindrical roll or a cambered roll or work piece is being produced.

As was fully explained above, the axes of the work and wheel may be accurately aligned for parallelism in vertical planes by the adjusting screw 66 and abutment 67, while to take care of misalignment in the horizontal plane use is made of the adjusting screws 74 and abutment 70.

In order to effect lapping operations the grinding wheel is replaced by a second grinding wheel of a much finer grain than that usually employed for performing grinding operations. The wheel head is then adjusted about the axis of the trunnion 63 either in a counterclockwise or a clockwise direction respectively diagrammatically shown in Figures 12 and 13. With the wheel adjusted to either of these angles a trueing tool or diamond is passed across the face of the wheel, which results in the wheel having a concaved resultant contour, that is, the center of the wheel is smaller than the ends. At this time the clutch 52 is shifted to connect the sheave 45 to the countershaft 35. Wherefore the sheaves 41 and 45 are utilized for rotating the grinding wheel at a comparatively slow rate of speed. Also, at this time the headstock motor 17 is rotated in a direction opposite to that in which it was rotated during the grinding operation, wherefore, the grinding wheel rotates in a counterclockwise direction while the work is also rotated in a counterclockwise direction as illustrated in Figures 12 and 13. The speed of rotation of the work at this time is not solely dependent upon the diameter of the work being operated upon, but partly on the grade of finish to be produced, that is, the finer the finish desired the faster will be the speed of rotation of the work. At this time then the proximate portions of the work and wheel are traveling in the same direction, namely, downwardly, and the ratio is much lower than the grinding ratio with a resultant fine or light cut being effected on the work per axial pass of the wheel and work.

As fully explained above, with the axes of the work and wheel angularly disposed to one another the wheel contacts with the work along a line diagonal or angularly related to the axis of the work and thereby spans previously produced imperfections in the work for eradicating said faults. The resultant surface on the work is a regular surface substantially devoid of chatters and grain lines which result from ordinary grinding operations.

By the present invention and to further eliminate possible surface marks, the work and wheel may have a relative axial reciprocation with the wheel canted as shown in Figure 12 in one direction, while in the reverse direction the angularity is reversed as shown in Figure 13. It should be noted that but a single trueing of the wheel is necessary for using the wheel at either angle, providing the angle of inclination is the same on each side. The reason for this is believed obvious since the axis of oscillation of the wheel head is at a point where the horizontal and vertical axes of the wheel cross, which is in the same plane as the axis of the work.

From the foregoing it is believed now evident that there has been provided an improved machine tool for producing accurate, fine surfaces on cylindrical work pieces.

What is claimed is:

1. In a grinding machine of the class described the combination of a bed, a work supporting table on the bed for supporting a work piece for rotation about a predetermined axis, reversible means for rotating the work at variable speeds and in opposite directions, a grinding wheel associated with the bed for rotation about an axis, means for supporting the grinding wheel with its axis parallel with or angularly related to the axis of the work, and means for rotating the wheel selectively at one of a plurality of speeds whereby the ratio between the peripheral travel of the work and wheel greatly vary depending upon the directions of rotations of the work and wheel and the relative speeds thereof.

2. In a grinding machine of the class described the combination of a bed, a work supporting table on the bed for supporting a work piece for rotation about a predetermined axis, reversible means for rotating the work at variable speeds and in opposite directions, a grinding wheel associated with the bed for rotation about an axis, means for supporting the grinding wheel with its axis parallel with or angularly related to the axis of the work, means for rotating the wheel selectively at one of a plurality of speeds whereby the ratio between the peripheral travel of the work and wheel greatly vary depending upon the directions of rotations of the work and wheel and the relative speeds thereof, and means for feeding the grinding wheel toward the work support.

3. In a grinding machine of the class described the combination of a bed, a work supporting table on the bed for supporting a work piece for rotation about a predetermined axis, reversible means for rotating the work at variable speeds and in opposite directions, a grinding wheel associated with the bed for rotation about an axis, means for supporting the grinding wheel with its axis parallel with or angularly related to the axis of the work, means for rotating the wheel selectively at one of a plurality of speeds whereby the ratio between the peripheral travel of the work and wheel greatly vary depending upon the directions of rotations of the work and wheel and the relative speeds thereof, means for feeding the grinding wheel toward the work support, and means for effecting a relative axial traversing movement of the work and wheel.

4. In a grinding machine of the class described for performing grinding and lapping operations the combination of a work support and grinding wheel support adjacent one another, the work support being adapted to support a work piece for rotation about a definite axis and the grinding wheel support rotatively supporting a spindle and grinding wheel for rotation about an axis disposed in the same horizontal plane while performing grinding operations, means for supporting the grinding wheel support for oscillation to dispose the axis of the spindle and grinding wheel angularly to the axis of the work during the performance of lapping operations, and means for rotating the work in one direction and at a given rate of speed during the performance of the grinding operation and in the reverse direction and at a different rate of speed during the performance of the lapping operation.

5. A grinding machine for the purpose described including a bed, a work support mounted on the bed, a main wheel slide carried by the bed for movement in a direction toward and from the work support, means for effecting such movement of the slide, a supplemental slide carried by the main slide, a trunnion connecting said slides, means for securing the slides in relative angularly adjusted position with respect to each other about said trunnion, a pivot bracket and a clamp plate carried by said second slide, a wheel head bearing a grinding wheel, said wheel head having a portion pivotally secured to the bracket, and an additional portion engageable with the clamp plate, and means for securing said portion to the clamp plate whereby the head and its supported wheel may be locked in desired angularly adjusted position with respect to the second slide.

6. A grinding machine for the purpose described including a bed, a work support mounted on the bed, a main wheel slide carried by the bed for movement in a direction toward and from the work support, means for effecting such movement of the slide, a supplemental slide carried by the main slide, a trunnion connecting said slides, means for securing the slides in relative angularly adjusted position with respect to each other about said trunnion, a pivot bracket and a clamp plate carried by said second slide, a wheel head bearing a grinding wheel, said wheel head having a portion pivotally secured to the bracket and an additional portion engageable with the clamp plate, means for securing said portion to the clamp plate whereby the head and its supported wheel may be locked in desired angularly adjusted position with respect to the second slide, a drive motor carried by the second slide and angularly adjustable therewith about the trunnion connection between the two slides, and driving connections between said motor and the wheel carried by the wheel head.

7. In a machine of the character described the combination with a bed, ways formed on the bed and disposed at right angles one to the other, a work support slidably mounted on one set of ways, a main wheel slide mounted on the second set of ways and movable in a direction toward and from the work support, a supplemental slide carried by the main slide, means for locking said main and supplemental slides in desired angular relation one with respect to the other, said second slide having an upstanding flange at the forward portion thereof and a trunnion bracket laterally offset as respects said flange, a wheel head having a portion for engagement with the upstanding flange and an offset wheel inclosing guard, a wheel spindle carried by the head, a wheel supported on the spindle and within the guard, means pivotally connecting the guard and slide bracket for establishing a center of angular adjustment of the wheel within the lateral bounds thereof, and means for securing the flange and interengaged portion of the wheel head one to the other to lock the head and thus the wheel carried thereby in desired angularly adjusted position about the trunnion.

8. In a machine of the character described the combination with a bed, ways formed on the bed and disposed at right angles one to the other, a work support slidably mounted on one set of ways, a main wheel slide mounted on the second set of ways and movable in a direction toward and from the work support, a supplemental slide carried by the main slide, means for locking said main and supplemental slides in desired angular relation one with respect to the other, said second slide having an upstanding flange at the forward portion thereof and a trunnion bracket laterally offset as respects said flange, a wheel head having a portion for engagement with the upstanding flange and an offset wheel inclosing guard, a wheel spindle carried by the head, a wheel supported on the spindle and within the guard, means pivotally connecting the guard and slide bracket for establishing a center of angular adjustment of the wheel within the lateral bounds thereof, means for securing the flange and inter-engaged portion of the wheel head one to the other to lock the head and thus the wheel carried thereby in desired angularly adjusted position about the trunnion, a driving motor for the wheel spindle mounted on the supplemental slide for angular adjustment therewith, and flexible drive connections between the motor and the wheel spindle whereby relative angular adjustment of the wheel head and bracket may be effected without disturbing the drive from the motor to the spindle.

WILLETTS PEASLEE.